United States Patent
Sircar

[11] Patent Number: 5,882,380
[45] Date of Patent: Mar. 16, 1999

[54] PRESSURE SWING ADSORPTION PROCESS WITH A SINGLE ADSORBENT BED

[75] Inventor: Shivaji Sircar, Wescosville, Pa.

[73] Assignee: Air Products and Chemicals, Inc., Allentown, Pa.

[21] Appl. No.: 949,298

[22] Filed: Oct. 13, 1997

Related U.S. Application Data

[60] Provisional application No. 60/046,423 May 14, 1997.

[51] Int. Cl.⁶ .............................................. B01D 53/053
[52] U.S. Cl. .................. 95/98; 95/100; 95/103; 95/105; 95/122; 95/130; 96/144
[58] Field of Search ................. 95/96–98, 100–105, 95/117–119, 122, 130; 96/108, 130, 144

[56] References Cited

U.S. PATENT DOCUMENTS

| | | | |
|---|---|---|---|
| 3,636,679 | 1/1972 | Batta | 95/100 |
| 3,738,087 | 6/1973 | McCombs | 95/130 X |
| 4,065,272 | 12/1977 | Armond | 55/25 |
| 4,194,892 | 3/1980 | Jones et al. | 55/58 |
| 4,348,213 | 9/1982 | Armond | 95/103 |
| 4,477,264 | 10/1984 | Kratz et al. | 95/103 |
| 4,511,377 | 4/1985 | McCombs | 55/163 |
| 4,561,865 | 12/1985 | McCombs et al. | 55/25 |
| 4,572,723 | 2/1986 | Ward | 95/96 |
| 4,576,614 | 3/1986 | Armond et al. | 95/96 X |
| 4,695,442 | 9/1987 | Pinto et al. | 95/96 X |
| 4,781,735 | 11/1988 | Tagawa et al. | 95/130 X |
| 4,892,566 | 1/1990 | Bansal et al. | 55/26 |
| 5,015,271 | 5/1991 | Reiss | 95/96 X |
| 5,032,150 | 7/1991 | Knaebel | 55/20 |
| 5,071,449 | 12/1991 | Sircar | 55/26 |
| 5,176,722 | 1/1993 | Lemcoff et al. | 95/102 |
| 5,223,004 | 6/1993 | Etéve et al. | 95/98 |
| 5,228,888 | 7/1993 | Gmelin et al. | 95/130 X |
| 5,370,728 | 12/1994 | LaSala et al. | 95/101 |
| 5,407,465 | 4/1995 | Schaub et al. | 95/130 X |
| 5,415,683 | 5/1995 | Leavitt | 95/101 |
| 5,429,666 | 7/1995 | Agrawal et al. | 95/130 X |
| 5,518,526 | 5/1996 | Vaksh et al. | 95/130 X |
| 5,520,720 | 5/1996 | Lemcoff | 95/130 X |
| 5,540,758 | 7/1996 | Agrawal et al. | 95/130 X |
| 5,565,018 | 10/1996 | Baksh et al. | 95/130 X |
| 5,656,067 | 8/1997 | Watson et al. | 95/130 X |
| 5,658,371 | 8/1997 | Smolarek et al. | 95/101 |
| 5,772,737 | 6/1998 | Andreani et al. | 95/98 |

FOREIGN PATENT DOCUMENTS 0771583  7/1997  European Pat. Off. .

*Primary Examiner*—Robert Spitzer
*Attorney, Agent, or Firm*—John M. Fernbacher

[57] ABSTRACT

A single-bed PSA system comprising a blower, an adsorber vessel, and a gas product storage tank separates a gas mixture using a three-step cycle comprising adsorption, evacuation, and pressurization. Pressurization is accomplished by introducing gas from the gas product storage tank into both the feed end and the product end of the adsorber vessel. Preferably a portion of the pressurization gas is introduced into the adsorber vessel by the blower, which also is used for providing feed to the adsorber and for withdrawing gas from the adsorber during the evacuation step.

13 Claims, 1 Drawing Sheet

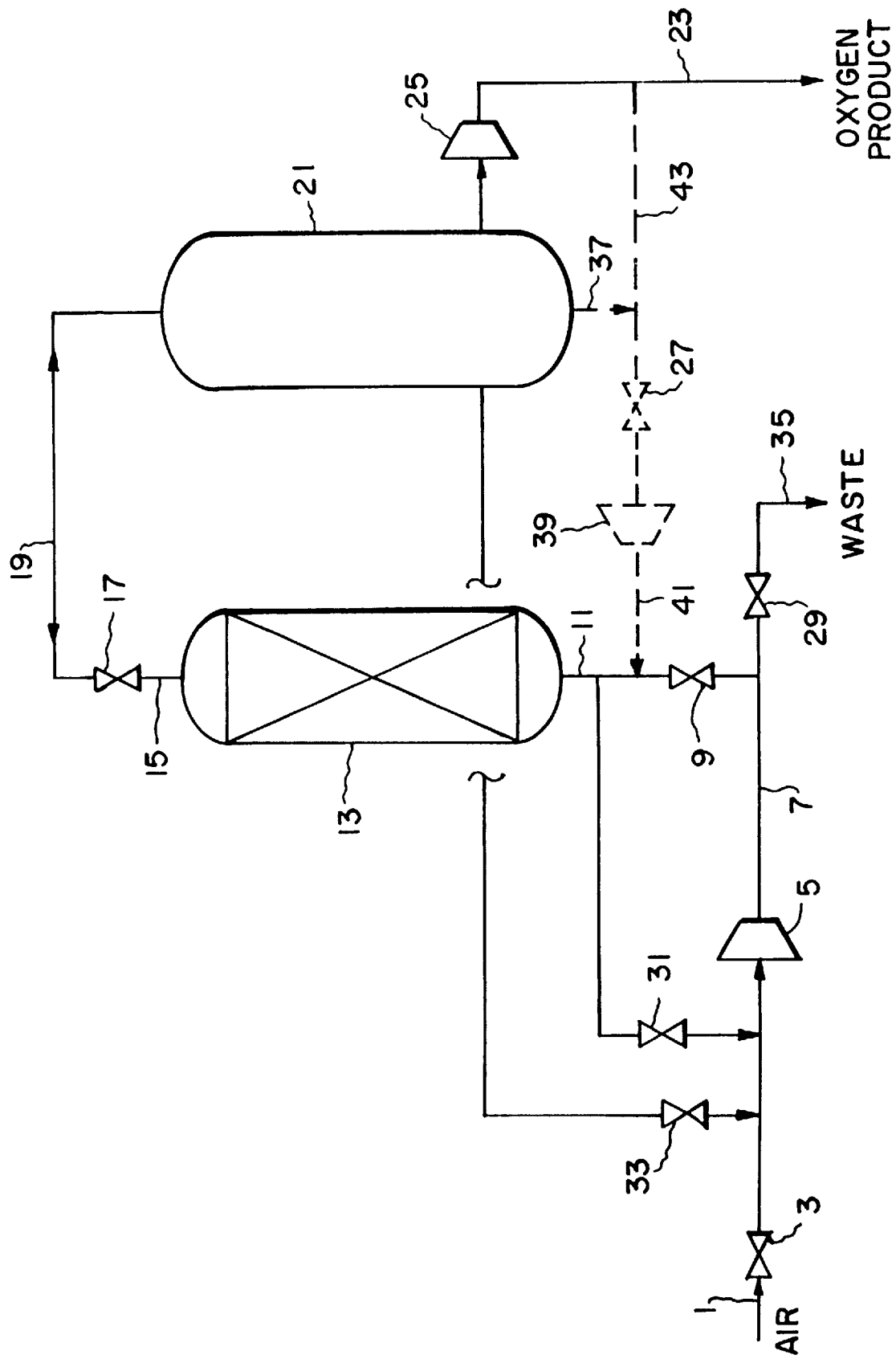

PRESSURE SWING ADSORPTION PROCESS WITH A SINGLE ADSORBENT BED

CROSS-REFERENCE TO RELATED APPLICATIONS

This application was filed as Provisional Application Ser. No. 60/046423 on May 14, 1997.

STATEMENT REGARDING FEDERALLY SPONSORED RESEARCH OR DEVELOPMENT

Not applicable.

BACKGROUND OF THE INVENTION

Pressure swing adsorption is a well-known method for the separation of bulk gas mixtures and for the purification of gas streams containing low concentrations of undesirable components. The method has been developed and adapted for a wide range of operating conditions, product purity, and product recovery. Many pressure swing adsorption (PSA) systems utilize two or more adsorber beds operated in a cyclic sequence in order to maintain a constant product flow rate while selected beds undergo various steps including adsorption, depressurization, desorption, purge, pressure equalization, pressurization, and other related steps. Multiple adsorber beds using numerous process steps are required to achieve high purity and/or recovery of valuable gaseous products such as hydrogen, carbon oxides, synthesis gas, light hydrocarbons, and the like. The high cost of generating the feed gas mixtures containing these valuable components usually justifies the complexity and capital expense of multiple-bed PSA systems.

Other gaseous products amenable to recovery by PSA do not require the high purity and/or recovery of the above-named products. In the recovery of oxygen and nitrogen from air by PSA, for example, lower purity products are acceptable for certain end uses and simpler PSA systems can be used for such products. These simpler PSA systems have significantly lower capital and operating costs than the multiple-bed systems earlier described. The simplest of these PSA systems for air separation utilize a single adsorber bed in conjunction with one or more gas storage vessels to allow constant product flow and provide gas for adsorber purge and pressurization during the regeneration portion of the PSA cycle. A number of single-bed PSA processes have been developed and are known in the art.

U.S. Pat. No. 4,561,865 discloses a single-bed PSA system comprising an adsorber and a surge tank operated with a feed compressor in a three-step cycle. First, compressed feed air is introduced into the adsorber, which increases the pressure in the adsorber, and simultaneously adsorber effluent is withdrawn into the surge tank. A portion of the gas is withdrawn from the surge tank as an oxygen-enriched product. The adsorber feed is then discontinued and the adsorber is vented countercurrently (i.e. through the adsorber feed end) to the atmosphere. During this venting step, purge gas from the surge tank is introduced into the product end of the adsorber. Upon completion of the vent/purge step, the adsorber and the surge tank are pressure equalized through the adsorber product end (i.e. countercurrently). The steps are repeated in a cyclic manner. U.S. Pat. No. 4,511,377 describes a modular apparatus using this PSA process.

A single-bed PSA system is described in U.S. Pat. No. 4,892,566 which utilizes an adsorber in conjunction with a surge tank, feed compressor, and switch valves to carry out a series of steps. First, compressed feed air is introduced into the adsorber, which increases the pressure in the adsorber while at the same time adsorber effluent is withdrawn into the surge tank. A portion of the gas is withdrawn from the surge tank as an oxygen-enriched product. The adsorber feed is discontinued and the adsorber outlet closed, and the adsorber is vented countercurrently (i.e. through the adsorber feed end) to the atmosphere. Gas from the surge tank is introduced into the adsorber countercurrently (i.e. through the adsorber product end) and the pressures in the adsorber and surge tank are equalized. The adsorber is then pressurized with feed air through the feed end and pressure equalized with the surge tank. The adsorber is further pressurized to a pressure above that of the surge tank, and finally the adsorber and surge tank are pressure equalized. The steps are then repeated in cyclic fashion.

U.S. Pat. No. 5,032,150 discloses a single-bed PSA process which utilizes multiple gas storage tanks in a PSA cycle to separate air. Compressed air is fed from an air feed tank into an adsorber presaturated with oxygen-rich gas from a previous cycle and the adsorber effluent is directed into a product collector tank, from which a portion of the gas is withdrawn as an oxygen-rich product. The adsorber outlet is then closed and the adsorber is pressure equalized with the air feed tank. Next, the adsorber is rinsed with nitrogen-rich gas from a nitrogen product tank, and the displaced gas is stored in the air feed tank. The nitrogen-saturated adsorber then is depressurized countercurrently (i.e. through the adsorber feed end) into the nitrogen product tank. Nitrogen may be withdrawn as a product if required. Finally the adsorber is purged countercurrently with oxygen-rich gas from the product collector tank to displace the nitrogen therein and then is pressurized countercurrently with the oxygen-rich gas to the adsorption pressure. The steps are repeated in a cyclic manner.

A single-vessel rapid PSA system is described in U.S. Pat. No. 5,071,449 in which the vessel contains dual adsorption layers and operates in alternating fashion with a continuous feed gas and two continuous product streams. A product surge tank is not used. Another rapid PSA system utilizing a single adsorbent bed operating in a cycle of 30 seconds or less is described in U.S. Pat. No. 4,194,892. The adsorber effluent optionally flows through a product surge tank to dampen flow fluctuations during adsorber cycling.

A single-bed PSA system with a product surge tank and an equalization tank is disclosed in U.S. Pat. No. 5,370,728. In the operation of this system, compressed air feed is introduced into the adsorbent bed, pressurizing the bed from an intermediate pressure up to a maximum adsorption pressure, and the effluent product is withdrawn from the bed into the product surge tank. The adsorbent bed then is isolated and depressurized cocurrently (i.e. through the product end) into an equalization tank at the intermediate pressure. Next, the bed is further depressurized countercurrently (i.e. through the feed end) to a lower desorption pressure, and the bed is purged countercurrently with gas from the product surge tank. The bed is then pressurized countercurrently to the intermediate pressure with gas from the equalization tank. Finally the bed is pressurized with feed air and the steps are repeated in a cyclic manner.

Single-bed PSA systems for generating an oxygen-enriched gas from air can be utilized efficiently as described in the art summarized above. Improvements to the simplest of these single-bed systems are advantageous and will encourage the wider use of such systems for the supply of moderate-purity oxygen or nitrogen. The invention described below and defined in the claims which follow offers an improvement to a single-bed PSA system for providing such products.

BRIEF SUMMARY OF THE INVENTION

The invention is a pressure swing adsorption process for the separation of a feed gas mixture containing at least one more strongly adsorbable component and at least one less strongly adsorbable component by introducing the feed gas mixture into a feed end of an adsorber vessel containing a solid adsorbent which preferentially adsorbs the more strongly adsorbable component, withdrawing from a product end of the adsorber vessel an adsorber effluent enriched in the less strongly adsorbable component, passing the adsorber effluent into a gas storage vessel, and withdrawing from the gas storage vessel a product stream enriched in the less strongly adsorbable component. The introduction of the feed gas mixture into the adsorber vessel is terminated and the adsorber vessel is depressurized by withdrawing therefrom a depressurization gas enriched in the more strongly adsorbable component. The adsorber vessel is pressurized by introducing gas from the gas storage vessel into the feed end and the product end of the adsorber vessel, and all steps are repeated in a cyclic manner.

The feed gas mixture preferably is air, wherein the more strongly adsorbable component is nitrogen and the less strongly adsorbable component is oxygen. The solid adsorbent preferentially adsorbs nitrogen and may be selected from the group consisting of NaX, NaA, CaX, LiX, mordenite, or CaA zeolite.

The depressurization gas preferably is withdrawn from the feed end of the adsorber vessel. If desired, a portion of the product stream enriched in the less strongly adsorbable component which is withdrawn from the gas storage vessel can be used for repressurizing the adsorber vessel. Alternatively, the pressurization gas can be withdrawn directly from the gas storage vessel independent of the withdrawal of product stream from the gas storage vessel.

Typically the pressure in the adsorber vessel during introduction of the feed gas mixture is between about 15 and 100 psia. The adsorber vessel preferably is depressurized to a final pressure of between about 0.15 and 12 psia before the pressurization step. The feed, depressurization, and pressurization steps may be carried out over a cycle duration of between about 30 and 240 seconds.

The invention includes a pressure swing adsorption system for the separation of a feed gas mixture containing at least one more strongly adsorbable component and at least one less strongly adsorbable component which comprises an adsorber vessel containing a solid adsorbent which preferentially adsorbs the more strongly adsorbable component, wherein the vessel has a feed end and a product end; a feed blower and piping means for introducing the feed gas mixture into the feed end of the adsorber vessel; and a gas storage tank for receiving adsorber effluent withdrawn from the adsorber vessel.

The system includes piping means for withdrawing from the gas storage vessel a product stream enriched in the less strongly adsorbable component, piping means for transferring adsorber effluent from the product end of the adsorber vessel to the gas storage vessel and for transferring gas from the gas storage vessel into the product end of the adsorber vessel, and piping means for transferring gas from the gas storage vessel into the feed end of the adsorber vessel. In addition, the system includes valve means for isolating the adsorber vessel from the gas storage vessel and the feed gas mixture, and also piping and valve means for withdrawing depressurization gas from the adsorber vessel.

Alternatively, the pressure swing adsorption system may include piping and valve means to enable the use of the feed blower to withdraw depressurization gas from the feed end of the adsorber vessel. If desired, the system can include piping and valve means to enable the use of the feed blower to transfer gas from the gas storage vessel into the feed end of the adsorber vessel.

BRIEF DESCRIPTION OF THE SEVERAL VIEWS OF THE DRAWINGS

The single Figure is a schematic flow diagram of the PSA system according to the present invention.

DETAILED DESCRIPTION OF THE INVENTION

The simplest single-bed PSA system must include at a minimum an adsorbent bed, a product surge or storage tank, a feed blower, and the necessary piping and valves to direct gas flow during the cycle steps. The single-bed PSA system of the present invention which utilizes these components is illustrated in the single Figure. Feed air 1 typically at ambient conditions passes through open valve 3 into the suction of blower 5 in which it is compressed to a pressure between about 15 and 100 psia. The compressed air feed passes through line 7, open valve 9, and inlet 11 to adsorbent vessel 13. An adsorbent which preferentially adsorbs nitrogen is packed in the vessel; this adsorbent can be a NaX, NaA, CaX, LiX, mordenite, or CaA zeolite, or any other adsorbent capable of selectively adsorbing nitrogen. If desired, two or more layers of different adsorbents may be used in which the first layer at the inlet end of the vessel preferentially adsorbs water and carbon dioxide and the second layer comprises the main part of the bed containing the adsorbent which preferentially adsorbs nitrogen. Aluminas, silica gels, and zeolites are adsorbent materials which preferentially adsorb water and carbon dioxide.

As the compressed feed air passes upward through adsorbent vessel 13, nitrogen is selectively adsorbed to yield adsorber effluent gas 15 containing about 50 to 95 mole % oxygen. This oxygen-enriched effluent passes through open valve 17 and line 19 into product gas storage tank 21. A portion of the oxygen-enriched gas is withdrawn from storage tank 21 to provide oxygen product 23. If oxygen product is required at a higher pressure, gas from the tank is compressed in product compressor 25. During this adsorption step, valves 27 (if used), 29, 31, and 33 are closed.

The adsorption step proceeds for a typical period of about 5 to 60 seconds, and then is terminated by closing valves 3, 9, and 17. Withdrawal of oxygen product 23 typically continues at this point. Evacuation of adsorbent vessel 13 proceeds by opening valves 31 and 29 while blower 5 continues to operate, thereby withdrawing void space gas and desorbing nitrogen adsorbed during the previous step. This nitrogen-enriched gas typically is vented as waste gas 35, but may be a useful product in some situations. The evacuation step reduces the pressure in adsorbent vessel 13 to between about 0.15 and about 12 psia. The evacuation step is terminated by closing valves 29 and 31.

In an alternative mode of operation, gas from gas storage vessel 21 is introduced into the product end of adsorber vessel 13 during at least a portion of the depressurization of the adsorber vessel, thereby purging the vessel to displace void space gas and desorbed nitrogen.

Adsorbent vessel 13 then is pressurized by opening valve 17 to allow oxygen-rich gas to flow from product tank 21 through lines 15 and 19 into the product end of the vessel. Simultaneously oxygen-rich gas from tank 21 is introduced through line 11 into the feed end of adsorbent vessel 13, thereby providing dual-end pressurization in combination with gas flow through line 15. Dual-end pressurization is continued in this fashion until the pressure in adsorbent vessel 13 is between about 15 and 100 psia. At the completion of the pressurization step, valves 9 and 33 (or alternatively valves 27 and 33) are closed, valves 3 and 9 are opened, and the adsorption step is repeated.

Pressurization gas can be introduced into the feed end of adsorbent vessel 13 according to the present invention in several ways. The preferred manner is to open valves 9 and 33 so that blower 5 transfers pressurization gas from tank 21 into the feed end of adsorbent vessel 13. This step is preferred because repressurization can be effected rapidly and also because this allows blower 5 to be operated continuously and used for pressurization in addition to feed compression and adsorbent vessel evacuation as earlier described. Alternatively, pressurization gas can be provided to the feed end of adsorbent vessel 13 by withdrawal through line 37, open valve 27, dedicated pressurization blower 39, and line 41. In another alternative, pressurization gas can be withdrawn as a portion of oxygen product 23 through open valve 27, line 41, and line 43 without the use of blower 39. In yet another alternative, pressurization gas can be provided to the feed end of adsorbent vessel 13 by withdrawal through line 37, open valve 27, and line 41 without the use of dedicated pressurization blower 39. In this alternative, complete pressurization of adsorbent vessel 13 might not be achievable during the desired pressurization period. In such a situation, a short time of additional pressurization using the air feed can be used to reach the required pressure in the desired time.

The three-step PSA cycle described above can be operated with a total time cycle of between about 30 and 240 seconds. The adsorption step duration preferably is between about 5 and 60 seconds, the evacuation step preferably is between about 15 and 160 seconds, and the pressurization step preferably is between about 2 and 20 seconds. A typical cycle duration is 60 seconds in which the adsorption step is 15 seconds, the evacuation step is 40 seconds, and the pressurization step is 5 seconds. The preferred dual-end pressurization of the present invention allows rapid pressurization and minimizes the duration of this step, thereby improving the overall efficiency of the PSA system. The short pressurization period helps to minimize the total cycle time, which in turn results in smaller adsorber beds for a given production rate.

Cyclic adsorber operation is controlled by the timed operation of the valves as described above. For the preferred embodiment in which blower 5 transfers pressurization gas from tank 21 into the feed end of adsorbent vessel 13, the valves operate according to the following schedule.

| | Valve number | | | | | |
|---|---|---|---|---|---|---|
| Step | 3 | 9 | 17 | 29 | 31 | 33 |
| Adsorption | open | open | open | closed | closed | closed |
| Evacuation | closed | closed | closed | open | open | closed |
| Pressurization | closed | open | open | closed | closed | open |

The process described above is well-suited for the separation of air, preferably to produce an oxygen product containing 50 to 95 mole % oxygen. The process can be used for the separation of other gas mixtures for applications in which moderate product recovery and/or purity are acceptable.

Thus the present invention provides an improvement to a single-bed pressure swing adsorption process and system in which the time required for adsorber pressurization is reduced by pressurizing the adsorber simultaneously from both the feed end and the product end. In a preferred mode of operation, the feed blower transfers pressurization gas to the feed end of the adsorber from the gas product storage tank. The preferred dual-end pressurization of the present invention allows rapid pressurization and minimizes the duration of this step, thereby improving the overall efficiency of the PSA system.

The essential characteristics of the present invention are described completely in the foregoing disclosure. One skilled in the art can understand the invention and make various modifications without departing from the basic spirit of the invention, and without deviating from the scope and equivalents of the claims which follow.

I claim:

1. A pressure swing adsorption process for the separation of a pressurized feed gas mixture containing at least one more strongly adsorbable component and at least one less strongly adsorbable component comprising the steps of:

(a) introducing the pressurized feed gas mixture into a feed end of a single adsorber vessel containing a solid adsorbent which preferentially adsorbs the more strongly adsorbable component, withdrawing from a product end of the adsorber vessel an adsorber effluent enriched in the less strongly adsorbable component, passing the adsorber effluent into a gas storage vessel, and withdrawing from the gas storage vessel a product stream enriched in the less strongly adsorbable component;

(b) terminating step (a) and depressurizing the adsorber vessel by withdrawing therefrom a depressurization gas enriched in the more strongly adsorbable component;

(c) pressurizing the adsorber vessel by introducing gas from the gas storage vessel into the feed end and the product end of the adsorber vessel; and (d) repeating steps (a) through (c) in a cyclic manner.

2. The process of claim 1 wherein the feed gas mixture is air, the more strongly adsorbable component is nitrogen, and the less strongly adsorbable component is oxygen.

3. The process of claim 2 wherein the solid adsorbent is selected from the group consisting of NaX, NaA, CaX, LiX, mordenite, or CaA zeolite.

4. The process of claim 1 wherein the depressurization gas is withdrawn from the feed end of the adsorber vessel.

5. The process of claim 1 wherein the gas from the gas storage vessel for pressurizing the adsorber vessel is a portion of the product stream enriched in the less strongly adsorbable component.

6. The process of claim 1 wherein the pressure in the adsorber vessel during step (a) is between about 15 and 100 psia.

7. The process of claim 1 wherein the adsorber vessel is depressurized during step (b) to a final pressure of between about 0.15 and 12 psia.

8. The process of claim 1 wherein steps (a) through (c) comprise a cycle with a duration of between about 30 and 240 seconds.

9. The process of claim 1 which includes following step (c) the additional step of further pressurizing the adsorber vessel by introducing pressurized feed gas into the feed end of the adsorber vessel for a period just prior to the initiation of step (a).

10. The process of claim 1 wherein gas from the gas storage vessel is introduced into the product end of the adsorber vessel during at least a portion of the depressurization of the adsorber vessel in step (b).

11. A pressure swing adsorption system for the separation of a feed gas mixture containing at least one more strongly adsorbable component and at least one less strongly adsorbable component which comprises:

(a) a single adsorber vessel containing a solid adsorbent which preferentially adsorbs the more strongly adsorbable component, wherein the vessel has a feed end and a product end;

(b) a feed blower and piping means for introducing the feed gas mixture into the feed end of the adsorber vessel;

(c) a gas storage tank for receiving adsorber effluent withdrawn from the adsorber vessel;

(d) piping means for withdrawing from the gas storage vessel a product stream enriched in the less strongly adsorbable component;

(e) piping means for transferring adsorber effluent from the product end of the adsorber vessel to the gas storage vessel and for transferring gas from the gas storage vessel into the product end of the adsorber vessel;

(f) piping means for transferring gas from the gas storage vessel into the feed end of the adsorber vessel;

(g) valve means for isolating the adsorber vessel from the gas storage vessel and the feed gas mixture; and (h) piping and valve means for withdrawing depressurization gas from the adsorber vessel.

12. The pressure swing adsorption system of claim 11 which further comprises piping and valve means to enable the use of the feed blower to withdraw depressurization gas from the feed end of the adsorber vessel.

13. The pressure swing adsorption system of claim 11 which further comprises piping and valve means to enable the use of the feed blower to transfer gas from the gas storage vessel into the feed end of the adsorber vessel.

* * * * *